United States Patent
Dufresne et al.

(10) Patent No.: US 9,943,835 B2
(45) Date of Patent: Apr. 17, 2018

(54) PROCESS FOR PASSIVATION BY A NITROGEN-CONTAINING COMPOUND OF A ZEOLITIC CATALYST, IN PARTICULAR A HYDROCRACKING CATALYST

(75) Inventors: Pierre Dufresne, Valence (FR); Mickaël Bremaud, St Georges les Bains (FR); Pauline Galliou, Chanas (FR); Sharath Kirumakki, Friendswood, TX (US)

(73) Assignee: EURECAT S.A., La Voulte sur Rhone (FR)

( * ) Notice: Subject to any disclaimer, the term of this patent is extended or adjusted under 35 U.S.C. 154(b) by 491 days.

(21) Appl. No.: 13/610,250

(22) Filed: Sep. 11, 2012

(65) Prior Publication Data
US 2014/0042057 A1    Feb. 13, 2014

(30) Foreign Application Priority Data
Aug. 9, 2012 (FR) .................... 12 02215

(51) Int. Cl.
| | |
|---|---|
| *B01J 29/06* | (2006.01) |
| *B01J 29/04* | (2006.01) |
| *C10G 47/06* | (2006.01) |
| *B01J 23/885* | (2006.01) |
| *B01J 23/883* | (2006.01) |
| *C10G 47/20* | (2006.01) |
| *B01J 37/20* | (2006.01) |
| *B01J 38/66* | (2006.01) |
| *C10G 47/16* | (2006.01) |

(52) U.S. Cl.
CPC ............. *B01J 29/04* (2013.01); *B01J 23/883* (2013.01); *B01J 23/885* (2013.01); *B01J 29/06* (2013.01); *B01J 37/20* (2013.01); *B01J 38/66* (2013.01); *C10G 47/06* (2013.01); *C10G 47/16* (2013.01); *C10G 47/20* (2013.01)

(58) Field of Classification Search
CPC ........ B01J 37/20; B01J 23/883; B01J 23/885; C10G 47/06; C10G 47/20

USPC .................................... 502/74, 79, 220, 221
See application file for complete search history.

(56) References Cited

U.S. PATENT DOCUMENTS

2002/0013223 A1*   1/2002   Eijsbouts et al. ............ 502/216

FOREIGN PATENT DOCUMENTS

WO      WO 0012653 A1 *   3/2000

OTHER PUBLICATIONS

Inamura et al. ("Development of zeolite hydrocracking catalyst and system for resid hydrodesulfurization unit," Catalysis Today 164(1), pp. 204-208, Apr. 2011).*

* cited by examiner

*Primary Examiner* — Elizabeth Wood
(74) *Attorney, Agent, or Firm* — Millen, White, Zelano & Branigan, P.C.

(57) ABSTRACT

A process for ex-situ treatment of a catalyst that contains at least one hydrogenating phase, and at least one amorphous silica-alumina or a zeolite that contains acid. The process includes:

a stage for introducing nitrogen by contact at a temperature that is less than 100° C., with at least one basic nitrogen-containing compound that is ammonia or a compound that can be decomposed into ammonia, the compound being introduced at a rate of 0.5-10% by weight (expressed in terms of N), and a sulfurization/activation stage with a gas that contains hydrogen and hydrogen sulfide at a temperature of at least 250° C., with this stage being carried out before or after the stage for introducing said nitrogen-containing compound, and optionally drying the catalyst that is obtained.

This treatment allows a rapid, effective start-up on the hydrocracking unit.

15 Claims, No Drawings

PROCESS FOR PASSIVATION BY A NITROGEN-CONTAINING COMPOUND OF A ZEOLITIC CATALYST, IN PARTICULAR A HYDROCRACKING CATALYST

The invention relates to a process for treatment of a catalyst, in particular a hydrocracking catalyst. This catalyst contains a hydrogenating function and an acid function.

The treatment will sulfurize and activate the hydrogenating function and passivate the acid function of the catalyst. This passivation consists in reducing the hydrocracking activity of the acid sites for preventing cracking reactions that are too fast and poorly controlled, during the start-up phase of the hydrocracking unit. The thus treated catalyst can be quickly started up without the risk of heat excursion and with a guarantee of good performances. The invention is particularly relevant for the hydrocracking catalysts that contain a zeolite, namely those that are the most acidic and therefore the most reactive, and therefore difficult to start up.

PRIOR ART

The processes and catalysts for hydrocracking petroleum feedstocks are widely known. They make it possible to convert various heavy feedstocks, in particular vacuum distillates (vacuum gas oils, VGO), into lighter and more hydrogenated products.

The hydrocracking catalysts contain both a hydrogenating function and an acid function (or cracking function).

The hydrogenating function is most often ensured by the mixed sulfides of at least one element of group VIB (preferably Mo, W) and at least one non-noble element of group VIII (preferably Co, Ni).

The cracking function originates from acid sites, contained in an amorphous silica-alumina, or in a zeolite-type crystallized silica-alumina. In very particular cases of the prior art, the use of a noble metal (palladium, for example) is combined with a high content of zeolite in the catalyst.

These catalysts have either high selectivities of diesel fuel (diesel) and moderate activities (their acid function is then ensured by a low content of zeolitic compound or amorphous silica-alumina whose acidity is known to be moderate), or high selectivities of naphtha and strong activities (their acid function is then ensured by a higher zeolite content). In an intermediate case, the production is maximized for kerosene (jet fuel).

Before their contact with the feedstock in the hydrocracking reactor, the catalysts are activated by sulfurization of catalytic elements of the hydrogenating phase (in general, the combination of nickel molybdenum NiMo or nickel tungsten NiW) that is present in oxide form. The activation is implemented either in-situ (in the reactor) or ex-situ (outside of the reactor). These methods are known to one skilled in the art.

In the in-situ method, the hydrogen sulfide is the sulfurizing agent; it is either introduced directly in a mixture with hydrogen or generated by decomposition of an added sulfurizing agent, such as, for example, DMDS (dimethyl disulfide), or even by decomposition of the sulfurized compounds naturally contained in a light feedstock that supplies the hydrocracking unit during the start-up phase.

The ex-situ methods are of two types and produce catalysts that are either simply sulfurized, or sulfurized and activated. In the first case, the catalyst is mixed with a sulfurized compound such as elementary sulfur or organic polysulfides, and optionally then treated thermally in the absence of hydrogen. The active sulfurized phase (for example, nickel sulfide with molybdenum or tungsten) thus is not yet formed. Reference is made to presulfurized catalyst. In the second case, the presulfurized catalyst is activated in the presence of hydrogen, or else the non-sulfurized catalyst is treated directly with a sulfurized compound, for example hydrogen sulfide H2S, mixed with hydrogen, which directly generates the active sulfurized phase (for example, mixed sulfides NiS/MoS2-WS2). Reference is made to activated, presulfurized catalyst.

The thus obtained catalysts are extremely active in their acid function and therefore their cracking capacity. Actually, they have not yet reached their state of equilibrium (steady state) because they have not yet been poisoned, or more precisely passivated, by the basic elements that are contained in the feedstock, organic nitrogen-containing compounds more or less already decomposed into ammonia. These catalysts therefore have a significant tendency to promote the hydrocracking reaction under premature conditions (of start-up), i.e., at a temperature where a catalyst in a state of equilibrium would not be active.

Since the hydrocracking reaction is very exothermic, the risk of this hydrocracking reaction being poorly controlled during the start-up phase and of causing exotherms or hot spots in the catalytic bed is significant. At worst, an uncontrolled reaction could cause an excursion of the reactor, and even a divergence, which may make the temperature rise to a point such that the catalyst is damaged, as well as the internals of the reactor or the reactor itself.

The control of this hydrocracking reaction on a catalyst during the start-up phase (start-up procedure) is therefore essential for safety reasons.

Once the start-up phase has taken place, after several days of operation, taking into account the fact that the feedstock of the hydrocracking device contains nitrogen contents often between 300 and 3,000 ppm, the catalyst in its steady state becomes partially covered with basic nitrogen-containing molecules, including ammonia. A certain adsorption-desorption equilibrium level of basic nitrogen-containing compounds is thus attained on the acid sites of the zeolite, the most acidic sites having been heavily neutralized, the least acidic sites being not very neutralized, and the catalyst thus operates in a stable fashion under conditions in accordance with what is expected.

It is clear that the state of a catalyst at steady state is very different from that of a fresh catalyst as to its acid force and therefore its capacity to crack the hydrocarbon-containing molecules, and the whole problem is indeed the transition from this fresh catalyst stage to a catalyst at steady state.

This is why so-called passivation methods have already been proposed for the purpose of reducing the activity of the acid sites.

This passivation was achieved by introducing selective poisons of the acid phase of the catalyst during the start-up phase of the hydrocracking unit, therefore in-situ, to make it possible to obtain a constant product quality over time. Thus, the U.S. Pat. No. 5,888,377 (UOP) recommended the addition of ammonia and the U.S. Pat. No. 3,794,580 (Shell) recommended the injection of amines.

In the U.S. Pat. No. 5,141,909 (Chevron), a process is described whose purpose is to make the zeolitic catalyst selective with regard to kerosene by in-situ addition of a nitrogen-containing selecting agent on a non-sulfurized catalyst. This catalyst contains a large quantity (5-95% and 60%, for example) of a particular Y zeolite (silica/alumina ratio of 27 to 33) and a noble metal of group VIII (0.01 to 5% and 0.28% Pd, for example), with the active phase (noble metal) being in metal form (no sulfurization). With the cracking function having a prominent place relative to the hydrogenating function, for orienting the reaction toward the production of kerosene, it was necessary to reduce the cracking activity upon the start-up of the reaction so as not to produce light gases and naphtha in excess. For this purpose of making it selective, a nitrogen-containing agent is added to the feedstock to be treated at the beginning of the cycle until the quantity of liquid is at maximum and the quantity of gas is at minimum. This operation is carried out in-situ at the reaction temperature, or 316° C., in the example and on the metal form of the active phase.

In the patent application US-2009/308790 (China Petroleum), the nitrogen-containing compound is introduced on a catalyst that contains sulfur, but is not activated ex-situ.

This patent describes a process for preparation of a catalyst that contains a hydrogenating function, an organic nitrogen-containing compound, a sulfurizing agent (elementary sulfur or an organic or inorganic sulfide), and an organic solvent (hydrocarbon-containing oil or ester). The process first comprises the introduction of a nitrogen-containing compound on a catalyst that can contain a molecular sieve (Y zeolite, for example), and with the catalytic phase (NiW, for example) being in oxide form, this introduction being followed by the introduction of a sulfurization agent (elementary sulfur, for example) into an organic solvent (acetates, peanut oil as examples), and then optionally a heat treatment at at most 180-300° C. under an atmosphere of a cover gas or oxygen. When the introduction of the sulfurization agent is carried out ex-situ, the final heat treatment is implemented. The catalyst that is obtained is charged into the reactor and activated before being brought into contact with the feedstock that is to be treated.

The catalyst is thus nitrated and sulfurized simultaneously ex-situ and then activated in-situ under hydrogen. Therefore, it is not really ready for use, with the catalytic phase having to be formed in the reactor during a specific stage for starting up the unit. Actually, activation is necessary, which takes place toward 350° C. and under hydrogen. The temperature next should be lowered toward 300° C., which is the so-called start-of-run temperature for treating the feedstock, for example by hydrocracking.

In contrast, it should be noted that the use of an organic solvent during the preparation phase offers drawbacks in terms of safety and the environment.

In a patent EP-335754, the applicant also recommended a process with simultaneous introduction of sulfur and nitrogen followed by activation under hydrogen. In a first stage, this process comprises—at a temperature of 0-50° C.—incorporation into the liquid polysulfide catalyst and a liquid nitrogen-containing organic compound that can decompose into ammonia. This product is treated thermally in a second stage, at 65-275° C., in the presence of water vapor or moist cover gas, but in the absence of hydrogen. The temperature is raised above 275° C. in the presence of hydrogen to carry out the sulfurization/activation, this being implemented in-situ or ex-situ.

It was possible to observe that the activation under hydrogen of a catalyst that thus contains an organic polysulfide can be done in a quite violent way, with the sulfurized compound decomposing quickly around 130-150° C. into hydrogen sulfide, which with the use of hydrogen implements the sulfurization of metal radicals. These reactions are exothermic and can cause a heating of the catalytic bed whose amplitude may be difficult to control and fix. The latter depends on the rate of removal of calories by the gas flow rate. The temperature elevation can also cause partial desorption of the nitrogen-containing compound, to the point that it is often difficult to evaluate what remains as a quantity of nitrogen on the catalyst before the introduction of the liquid feedstock, and in particular if there is enough of it left to effectively passivate the catalyst without running the risk of a premature hydrocracking reaction. The temperature elevation may be lower if the activation is carried out in the presence of hydrocarbon-containing feedstocks that are more effective than the gas by itself for removing calories. Nevertheless, the introduction of crackable feedstock at this level is difficult because if an exotherm was nevertheless displayed at this moment, all of the conditions would be combined to cause an excursion of the reaction.

In practice, this process is not very applicable without taking very significant and costly precautions for reducing the risks.

This drawback also applies to the patent application US-2009/308790 (China Petroleum), corresponding to a catalyst that contains sulfur and nitrogen, but is not yet activated.

The fact of charging a non-activated catalyst into the reactor has important consequences on the start-up procedure. Actually, this procedure is imperatively to comprise a gradual temperature increase phase followed by a plateau of several hours carried out at temperatures of 320-350° C., activation stage, necessary for manufacturing this active phase that consists of mixed sulfides that is carried out with hydrogen and the sulfur previously charged on the catalyst. This additional stage, when it is carried out in-situ, adds time to the start-up period, time that is lost for the production of the unit.

Methods for treatment of catalysts with nitrogen-containing compounds have also been used but for passivating hydrogenating sites in non-zeolitic catalysts. It is then a matter more of a selecting method rather than a passivation. Thus, in the U.S. Pat. No. 6,120,679 (Nippon Mitsubishi Oil), a so-called passivation method is described, applied on a catalyst that contains sulfur. In this process for desulfurization of FCC (Fluidized Bed Catalytic Cracking) gasoline, the elimination of sulfur is sought while minimizing the loss of octane, with octane being supplied by olefins. It was therefore necessary to keep the sites active relative to the desulfurization while reducing the activity of the active sites for the hydrogenation of the olefins. For this purpose, a basic nitrogen-containing compound, which has the property of essentially being adsorbed on the active sites by hydrogenation, is introduced on the catalyst. The catalysts that are used are of the GVIB-GVIII/alumina type, for example CoMo or NiMo/alumina, and they are lacking in zeolite. The nitrogen-containing compound is introduced on the catalyst in gaseous or liquid form, and, for example, mixed with a hydrocarbon-containing solvent, and at a rate of more than 10 mol (of compound)/mol of metals; it is indicated that the temperature should be at most 200° C., because otherwise a hydrocracking reaction appears that reduces the adsorption of the nitrogen-containing compound. The examples show that the catalyst with the hydrogenating phase in oxide form is charged into the reactor, a sulfur-containing compound is introduced, and then the catalyst is treated by the nitrogen-containing compound (pyridine, for example), in the presence of hydrogen at 150° C., and the feedstock is next sent to the catalyst.

It was therefore possible to note that the in-situ passivation process as practiced in the prior art has drawbacks:
It extends the start-up time of the hydrocracking unit and requires special attention on the part of the operator;
It requires the injection of a nitrogen-containing compound, often ammonia, which involves special precautions in terms of safety and environment (storing the product, injection, treatment of effluents . . . );

The quantity of nitrogen is difficult to determine, since the catalyst adsorbs much of it. Actually, at the temperature at which the in-situ passivation is to take place, the nitrogen adsorption is not carried out selectively on the acid sites. Other sites, probably the metal elements, contribute to adsorbing the nitrogen in a temporary way at low temperature, which leads overall to excess quantities of adsorbed nitrogen;

Excess ammonia will next desorb catalyst during the temperature increase phase, which exhibits a double drawback. On the one hand, it may contribute to the formation of ammonium sulfide in the equipment downstream from the reactor, which can generate troublesome pressure drops, and even prevent the operation of gas compressors. Actually, NH3 and H2S combine easily into ammonium sulfide, which crystallizes in the cold parts of the installation. In general, equipment for washing with charged water to continuously dissolve this compound is provided, but nevertheless, the significant influx of NH3 can cause an unusual situation. On the other hand, this excess nitrogen finds itself integrally within the aqueous liquid effluents that it is necessary to treat in an effluent treatment station.

SUMMARY OF THE INVENTION

The need exists for developing a new process that is acceptable in terms of the environment and safety and that is effective for allowing a start-up that is fast and poses no risk to the refinery unit. The time savings in the start-up phase of the reactor makes it possible to attain more quickly the conditions for production of petroleum products that meet specifications and correspond to a significant gain in productivity.

The invention does not exhibit the drawbacks of the processes of the prior art.

Important advantages are that, because of the introduction of the ex-situ nitrogen, the introduction of the ex-situ sulfur, the ex-situ activation (production of the active phase), the non-use of the in-situ nitrogen-containing compounds, and the catalyst charged into the reactor containing the quantity of nitrogen that is adjusted to the number of acid sites, the start-up time becomes minimal, the quantity of ammonia desorbed by the catalyst is minimal, and the safety of the process is reinforced.

The invention proposes a process in which the catalyst arrives ready for use on the site of the refinery, i.e., sulfurized and activated, charged with nitrogen, without there being a need for implementing the activation by sulfurization of the catalyst in the reactor as is the case in the prior art. The catalyst contains nitrogen. It is passivated or else the final passivation action is obtained in the reactor without an additional operation.

The invention is particularly relevant for the catalysts, such as those of hydrocracking, containing a zeolite. The latter are the most acidic and the most reactive and therefore difficult to start up. The treatment comprises the sulfurization and the activation of the hydrogenating function and the passivation of the acid function of the catalyst. This passivation consists in reducing the initial hydrocracking activity of the acid sites of the zeolite to prevent cracking reactions that are too fast, and therefore an excursion, during the start-up phase of the hydrocracking unit.

The invention relates more specifically to a process for ex-situ treatment of a catalyst that contains at least one hydrogenating phase, and at least one amorphous silica-alumina or a zeolite that contains acid sites, whereby said process comprises:

A stage for introducing nitrogen by contact at a temperature that is less than 100° C., with at least one basic nitrogen-containing compound that is ammonia or a compound that can decompose into ammonia, whereby said compound is introduced at a rate of 0.5-10% by weight (expressed in equivalent terms of N), and A stage for activation by sulfurization with a gas that contains hydrogen and hydrogen sulfide at a temperature of at least 250° C., whereby this stage is implemented before or after the stage for introducing nitrogen.

The catalyst that is obtained is optionally dried.

In one embodiment, the sulfurization/activation stage is implemented after the stage for introducing said nitrogen-containing compound. In another embodiment, the sulfurization/activation stage is implemented before the stage for introducing said nitrogen-containing compound. In any case, the passivation, i.e., the fixing of the nitrogen on the acid sites, is achieved through thermal treatment under hydrogen at at least 250° C. In the embodiment where the sulfurization/activation stage is implemented before the stage for introducing said nitrogen-containing compound, the catalyst that is obtained is charged into the reactor, and the final passivation is advantageously achieved in the reactor. In this embodiment, the catalyst is advantageously dried ex-situ after the introduction of liquid nitrogen-containing compound.

Preferably, the nitrogen-containing compound is selected from among the group of water-soluble amines. Advantageously, the nitrogen-containing compound is introduced by dry impregnation in the presence of a solvent, preferably water. Preferably, the catalyst is next dried. In general, the stage for introducing nitrogen is implemented in the absence of hydrogen.

The sulfur and the nitrogen are introduced in such a way that the catalyst that is obtained contains 5 to 25% by weight of sulfur and 0.1 to 10% by weight of nitrogen, preferably 8 to 15% 5 and 1 to 5% N.

Preferably, as a hydrogenating phase, the catalyst contains at least one element of the group VIB and at least one non-noble element of group VIII. The process applies particularly well to the catalysts that contain a zeolite.

The process applies particularly well for a hydrocracking catalyst, and in particular to those that contain a zeolite, in particular a Y or USY (Ultra Stable Y) zeolite, and at least one hydrogenating element, most often an element of GVIII, noble or non-noble, and preferably non-noble.

The preferred catalysts covered by the invention contain at least one zeolite and at least one element of group VIII, in general nickel, of between 2 and 8% by weight (calculated on the basis of oxide NiO), and at least one non-noble element of group VIB, in general molybdenum and tungsten, of between 10 and 30% by weight (calculated on the basis of oxide MoO3, WO3). Preferably, the catalyst contains the pair NiMo or NiW. Other elements can be present in the catalyst, by way of additives, such as phosphorus or boron . . . .

These catalytic elements of the groups VIB and VIII are in oxide form in the catalyst that is to be treated.

The process according to the invention makes it possible to treat the new catalysts (catalysts not yet used) or regenerated catalysts (spent catalysts that are obtained from the catalytic reaction that are regenerated; the regeneration methods are known to one skilled in the art).

The invention also relates to the use of the catalyst that is obtained by the process according to the invention in a process for transformation of hydrocarbon-containing feedstocks, which is preferably a hydrocracking process.

DETAILED DESCRIPTION OF THE INVENTION

Any zeolite that contains acid sites can be treated. Among these zeolites, or molecular sieves, it is possible to cite those of type Y or USY (Ultra Stable Y), MFI or ZSM5, beta, omega, or any crystallized aluminosilicate having aluminum atoms in tetrahedral position and surrounded by silicon via oxygen bridges and generating an H+ proton that is put next to each tetrahedral aluminum atom. The zeolites that can advantageously benefit from the invention are described in the work of Meier, W. M., et al., Atlas of Zeolite Structure Types, 4$^{th}$ Ed., Elsevier: Boston (1996). The zeolite content in the substrate (zeolite(s)+binder(s)) is between 1 and 70% by weight and more generally between 3 and 50% by weight and even more preferably between 5 and 30%.

A stage for introducing nitrogen by contact with at least one basic nitrogen-containing compound is implemented on this catalyst. This stage is separate from the sulfurization stage. The nitrogen and the sulfur are not introduced together.

This compound is ammonia or a compound that can be decomposed into ammonia under the conditions of the hydrocracking operation. The nitrogen-containing compound can be introduced in the gaseous state but preferably in the liquid state.

The preferred compounds are from the family of amines. For example, primary, secondary or tertiary amines, diamines and polyamines, alkylamines, arylamines, arylalkylamines, aniline, methylaniline, dimethylaniline, diphenylamine, and triphenylamine. Preferred amines are alkylamines, and in particular the ethanolamines, such as, for example, N-methyldiethanolamine (MDEA) or N-methylethanolamine (MAE), triethanolamine (TEA), others such as 3-diethylamino-propylamine (DEAPA) or N,N-dimethyldipropylenetriamine (DMAPAPA), tri-n-butylamine (TNBA), hexadecylamine (HDA), and oleylamine (OL, octa-9-decenylamine).

The water-soluble amines are the easiest to use. It is also possible, however, to use other solvents, if necessary, such as, for example, alcohols, white spirit, or other mineral or organic liquids that are known for dissolving, under the conditions of the process, the selected nitrogen-containing compounds.

The introduction of nitrogen on the catalyst is carried out at a temperature that is less than 100° C. and preferably in the absence of hydrogen. The best passivation effects are achieved when the desired quantity of nitrogen is distributed homogeneously over all of the catalyst grains. This homogeneity results from, for example, the use of a fluidized bed for implementing this stage.

A convenient way to introduce this nitrogen-containing compound is to dilute it in a solvent, and then to initiate dry impregnation that makes it possible to fill the pore volume of the catalyst. Next, the catalyst is dried so as to evaporate this solvent partially and preferably completely. Water-soluble nitrogen-containing compounds will preferably be used, which makes it possible to use water as a solvent. This arrangement is preferable in terms of the environment, safety, and cost.

The final passivation action consists in the selective fixing of nitrogen-containing compounds on the acid sites of the zeolite. It is finalized during a heat treatment under hydrogen at at least 250° C. of the catalyst that contains nitrogen. This fixing can be achieved ex-situ but equally in-situ during the start-up of the reaction. This final action consists in that the nitrogen-containing precursor partially desorbs temporary adsorption sites for selectively covering the acid sites of the zeolite, in the original state of this nitrogen-containing molecule or in a form that is partially decomposed into ammonia.

The nitrogen is introduced in such a way that the catalyst that is obtained contains 0.1 to 10% by weight of nitrogen (calculated by weight of N), preferably 1 to 5% by weight of N. The quantity of nitrogen is adapted based on the type of catalyst and more specifically based on the number of acid sites and the degree of passivation desired.

The number and the force of the acid sites of a hydrocracking catalyst depend on the proportion of zeolite in this catalyst as well as the type of zeolite. It is known that the number and the force of acid sites can be regulated using the silica/alumina ratio of the crystalline framework. Thus, the most acidic catalysts, i.e., those that cause the most cracking and make it possible to obtain naphtha as a preferred product, contain a larger quantity of zeolite, which is itself rich in acid sites owing to an Si/Al ratio with a moderate crystalline framework. The catalysts that make it possible to obtain diesel fuel (diesel) as a preferred product contain a moderate proportion of zeolite, which is itself less rich in acid sites owing to an Si/Al ratio with an elevated framework. Certain catalysts do not contain zeolite, simply an amorphous aluminosilicate, whose acid sites are less strong than those with a crystalline structure. One intermediate category corresponds to catalysts that are fairly selective in terms of kerosene (jet fuel).

For the catalysts that are selective in terms of naphtha, the quantity of nitrogen often will be 2-10% by weight (calculated by weight of N), and it will rather be 0.5-4% by weight of N for catalysts that are oriented toward a diesel target.

The process also comprises a sulfurization/activation of the hydrogenating phase. It is implemented either (1$^{st}$ mode) before the introduction of the nitrogen-containing compound or (2$^{nd}$ mode) after, but not simultaneously.

The sulfurization/activation stage is always implemented in the presence of hydrogen. It is carried out with a gas that contains a mixture of hydrogen and hydrogen sulfide (H2/H2S), at a temperature of at least 250° C., and at a pressure that may be atmospheric pressure. It is preferably implemented in the absence of organic solvent; this offers an advantage in terms of safety and industrial use. Advantageously, the temperature is higher than 300° C. or at best at least 320° C., and even 350° C., in particular for the NiW pair; this makes possible a more complete activation, and namely a better formation of the active sulfurized phase.

In the first mode, the introduction of nitrogen is carried out ex-situ on the catalyst that already contains an active phase that is sulfurized and activated ex-situ. The sulfurization/activation stage is carried out preferably with a gas that contains a mixture of hydrogen and hydrogen sulfide (H2/H2S), at a temperature of at least 250°, and at atmospheric pressure.

In the 2$^{nd}$ mode, the introduction of nitrogen is carried out ex-situ on the catalyst with the hydrogenating phase in oxide form and is next followed by the sulfurization/activation stage.

In the two modes, a sulfurized and activated catalyst that contains nitrogen is obtained.

In the 1$^{st}$ mode (introduction of nitrogen on sulfurized and activated catalyst), the action for finalization of passivation, consisting in the selective fixing on the acid sites of the basic nitrogen-containing compound, optionally decomposed into ammonia, is carried out preferably in-situ during the rise in temperature of the catalyst in the reactor under hydrogen pressure.

In this case, the catalyst that is sulfurized, activated and charged with nitrogen can be dried ex-situ and then charged into the reactor. The drying makes it possible to eliminate at least in part the solvent that is used for the introduction of nitrogen with a liquid nitrogen-containing compound.

The final passivation action can equally be implemented ex-situ.

In the 2$^{nd}$ mode, this action for finalization of the passivation is carried out essentially at the time of the sulfurization/activation ex-situ. This sulfurization/activation stage is carried out with a gas that contains, for example, a mixture of hydrogen and hydrogen sulfide (H2/H2S) at a temperature of at least 250° C. and atmospheric pressure. The nitrogen content of the catalyst can optionally be a little reduced during this stage because of a partial desorption of the nitrogen-containing compound, a function of the type of compound, and the treatment temperature.

The 1$^{st}$ mode is the preferred mode, for two reasons. The first is that, in the 2$^{nd}$ mode, it was possible to note a slight loss of nitrogen during the sulfurization/activation, which requires an adjustment of the initial quantity of adsorbed nitrogen and can complicate the preparation process.

The second relates to the self-heating properties of the sulfurized catalysts.

The hydrotreatment/hydrocracking catalysts based on metals of groups VI and VIII such as cobalt or nickel and molybdenum or tungsten containing sulfur have a self-heating nature. This nature is more or less pronounced according to the sulfurized phase quantity: high for activated catalysts, lower for catalysts that still contain essentially oxides and a compound that contains sulfur. This self-heating phenomenon is known to one skilled in the art.

In the 1$^{st}$ mode, the fact of introducing nitrogen on the already activated, and therefore already self-heating, catalyst makes possible a reduction of this effect. The reason may be the presence of nitrogen-containing compound, and it may also be that the drying operation has the result of bringing the catalyst to an elevated temperature in the presence of a certain quantity of oxygen. Thus, the superficial oxidation of the sulfurized phase, or, at the very least, the chemisorption of oxygen on this metal sulfurized phase, has the effect of reducing the self-heating effect. This constitutes a prized benefit of the invention. If the solvent that is used is water, the drying can be done, for example, at temperatures of 120-140° C. in the presence of air or air that is depleted of oxygen.

The introduction of nitrogen is implemented preferably ex-situ on catalyst particles in motion. The catalytic bed is then preferably a moving bed, for example a circulating bed, a fluidized bed, an expanded bed, a boiling bed, or a rotating bed.

The advantage of using a fluidized bed is to be able to obtain a homogeneous distribution of nitrogen over the entire bed, in particular when it is brought in by a liquid.

This was not the case when, as in the prior art, the nitrogen is brought in in-situ into the reactor in a fixed bed, either in liquid form or in gaseous form. This nitrogen can be distributed in the reactor in a very unequal way, with high nitrogen concentration gradients. These deviations in the passivation levels can produce exotherms locally in the zones where the passivation would be inadequate.

By contrast, it was possible to note that in the prepared catalyst according to the invention, the nitrogen content varies statistically from at most 20% around a mean value that corresponds to the specification.

This mean content is between 0.5 and 10% by weight (expressed in terms of N) and preferably 1 to 5% N.

The introduction of nitrogen can be done by a dry impregnation technique with a solution that contains the nitrogen-containing compound. It is implemented in a known manner, so as to fill the pore volume of the catalyst more or less completely (and preferably completely).

When it is implemented ex-situ, the sulfurization/activation is advantageously performed on catalyst particles in motion. The catalytic bed is then preferably a moving bed, for example a circulating bed, a fluidized bed, an expanded bed, a boiling bed, or a rotating bed. The advantage of using a fluidized bed, and preferably a moving bed, is to be able to obtain a homogeneous distribution of the sulfur over the entire bed.

This advantage is particularly advantageous when the catalyst already contains the nitrogen that has been introduced ex-situ as described in the type of bed above; the sulfurization/activation and passivation by fixing the nitrogen on the acid sites are done homogeneously.

The invention also relates to the use of the catalyst that is obtained by the process according to the invention in a process for transformation of hydrocarbon feedstocks, which is preferably a hydrocracking process.

The hydrocracking process consists in transforming a heavy petroleum feedstock, often a vacuum distillate, into different, more refined and lighter products, in particular bases of lubricating oils, diesel fuel, kerosene (or jet fuel), and gasolines. It is carried out in the presence of hydrogen at pressures of in general between 100 and 200 bar, and at temperatures of 300 to 400° C. This process is extensively described in the prior art.

Putting the hydrocracking process into operation begins by a start-up phase that comprises a gradual rise in temperature up to the reaction temperature in the presence of hydrogen. The passivation is finalized, if necessary, during this stage. Subsequently, at a higher temperature, the ammonia partially desorbs at an equilibrium level, and the catalyst then recovers an activity corresponding to its steady state.

The process according to the invention thus makes possible a better control of the sulfurization/activation treatments of the hydrogenating phase and the introduction of nitrogen on the acid sites; a catalyst that is not only better passivated but also very active in established operation is thus obtained, as the examples below show.

EXAMPLES

Example 1: For Comparison—Catalyst A—Sulfurization/Activation by H2/H2S, without Introduction of Nitrogen 200 ml of a commercial hydrocracking catalyst that contains approximately 20% USY zeolite, alumina, and 4.3% by weight of NiO and 22.7% by weight of WO3 are charged into a glass reactor and sulfurized in the presence of H2/H2S under the following conditions: flow rate of 25 liters of H2S and 37 liters of H2 per hour, a rise in temperature of 2° C./minute up to 350° C. with a plateau of 4 hours at this temperature, cooling by a stream of N2, and then exposure to ambient air for 4 hours.

The sulfurized, activated catalyst A that contains 7.1% by weight of sulfur, which corresponds to 95% of the theoretical stoichiometric quantity for the WS2 and Ni3S2 sulfides, is obtained.

Example 2: For Comparison—Catalyst B—Sulfurization, No Activation, Followed by Introduction of Nitrogen by the Amine MDEA 200 ml of oxide catalyst as used in Example 1 is impregnated with a solution of TNPS (tertio-nonyl polysulfide containing 37% by weight of sulfur) in toluene and dried under a stream of N2 at 140° C.

120 g of this catalyst (expressed on the basis of dried catalyst) is next impregnated with 48 ml of a solution of 4 ml of MDEA (methyl diethanolamine) in 44 ml of water for introducing 2% by weight of N, and then dried again under a stream of an air/nitrogen mixture at 120° C. The sulfur content of the catalyst is 7.3% by weight and that of nitrogen is 2.16%.

The catalyst B, sulfurized but not activated and containing nitrogen, is thus obtained. This catalyst is similar to the catalyst of the prior art US-2009/308790.

Example 3: According to the Invention—Catalysts C1 and C2—Sulfurization/Activation by H2S/H2, Followed or Preceded by the Introduction of Nitrogen by the Amine MDEA 120 g of the sulfur-containing catalyst A of Example 1 (expressed in terms of a dry catalyst base) is impregnated with 48 ml of a solution of 4 ml of MDEA (methyl diethanolamine) in 44 ml of water to introduce 2% of N, and then dried under a stream of an air/nitrogen mixture at 120° C. The sulfurized, activated catalyst C1 that contains nitrogen is obtained. The sulfur content of the catalyst is 7.1% by weight and that of nitrogen is 2.03%.

The self-heating property is measured as follows. The catalyst is placed in a cubic mesh box one inch on a side, with a thermocouple placed in the center of the box; the cube is placed into an oven that is preheated to the temperature T. The temperature is recorded. When this temperature reaches the level T+60° C. within the 6 hours after introduction into the furnace, the test is called positive, and the experiment is restarted at a temperature that is 10° C. lower. Conversely, if the test is negative (temperature that does not reach T+60° C.), the test is repeated at T+10° C. until a temperature level T' that provides a positive test is found. The result is announced by the Temperature Critique d'Auto-échauffement [Critical Self-Heating Temperature] (TCAE) that is expressed by the value T' reduced by 5° C. (T°-5° C.).

The TCAE of the catalyst C1 is 95° C., which means that the catalyst is also to be classified as self-heating according to the law, but handling in air is allowed.

The catalyst C2 is prepared in reverse order of C1, namely first the passivation, followed by sulfurization/activation. A quantity of 130 g (expressed in terms of a dry catalyst base) of the same commercial hydrocracking catalyst as the one used in Example 1 is impregnated with 52 ml of a solution that contains 4.3 ml of MDEA (methyl diethanolamine) in 47.7 ml of water for introducing 2% N, and then dried under a stream of an air/nitrogen mixture at 120° C. 120 g is next charged into a glass reactor and sulfurized in the presence of H2/H2S (25 liters of H2S, 37 liters of H2 per hour), with a rise in temperature of 2° C./minute up to 350° C. and a plateau of 4 hours at 350° C., cooling by a stream of N2, and then exposure to ambient air. The sulfurized, activated catalyst C2 that contains 6.9% by weight of 5 and 1.58% by weight of N is obtained.

The TCAE of the catalyst C1 is 45° C., which means that the catalyst is also very sensitive to the self-heating, and handling of it in air on a large scale could give rise to uncontrolled heating phenomena.

Example 4: Catalytic Evaluation

The tests below demonstrate the effect of the introduction of nitrogen ex-situ on the catalyst that is to neutralize the strong initial activities without affecting the activities in established operation.

The test protocol uses the conversion of n-heptane into cracked and isomerized products. Only the values of the conversion are posted below, because they are indicative of the force of the catalytic activity. The conversion is expressed in terms of weight of converted n-heptane divided by the initial weight of n-heptane.

Test 1 on Catalyst A (Sulfurized, Activated, without N Introduced):

10 g of catalyst A is charged into the reactor of the test unit. The feedstock is n-heptane with an additive of DMDS (dimethyl disulfide) at a rate of 1% by weight of S, and 0.1% by weight (1000 ppm) of N by the amine DEAPA (diethylaminopropylamine). These levels of sulfur and nitrogen are representative of those that are found in a typical VGO (Vacuum Gas Oil). The total pressure is set at 30 bar, the temperature is brought to 100° C., and then the feedstock is injected at a flow rate that corresponds to an hourly volumetric flow rate (LHSV) of 1; the temperature is brought to 300° C. with a temperature rate of climb of 2° C./minute, and then left level for 2 hours. The conversion of n-heptane measured at 300° C. is 26%.

The feedstock is then maintained for 36 hours so that the catalyst attains equilibrium with the 1,000 ppm of nitrogen provided by the feedstock. The temperature then rises at a rate of 2° C./minute up to 400° C. and then is kept level for 24 hours. The conversion of n-heptane is measured at 33%.

Tests 2a and 2b on the Catalyst B (Sulfurized, Not Activated, N Introduced):

The protocol of the test 2a takes into account the fact that the catalyst B is not activated and that it requires an in-situ activation phase with a plateau at 360° C. under hydrogen.

10 g of catalyst B is charged into the reactor of the test unit. The total pressure is set at 30 bar, and the temperature is brought to 350° C. with a temperature rate of climb of 2° C./minute, and then is left level for 2 hours. The temperature is next lowered to 100° C., and then the feedstock is injected at an LHSV of 1; the temperature is brought to 300° C. at 2° C./minute, and then is left level for 2 hours. No conversion of n-heptane is measured at 300° C. (<1%), which results from the passivation of the acid sites. The temperature is raised to 360° C. at a rate of 2° C./minute, and then after 2 hours at plateau, the conversion is determined. It is 10%.

The feedstock is then maintained for 34 hours so that the catalyst attains equilibrium with the 1,000 ppm of nitrogen provided by the feedstock. The temperature is then raised to 400° C. at a rate of 2° C./minute, and then after 24 hours at plateau, the conversion is determined. The catalyst is then considered to be in steady state. The conversion of the n-heptane is 28%.

In the test 2b, the catalyst B is also compared to others by using the standard procedure as used for the catalyst A, namely: 10 g of catalyst B is charged, the total pressure is adjusted to 30 bar, the temperature is brought to 100° C., and the feedstock is injected at an LHSV of 1. The temperature is brought to 300° C. with a temperature rate of climb of 2° C./minute. After 2 hours at 300° C., there is no detectable conversion (<1%), which results from the passivation of the acid sites. The temperature is raised to 360° C. at a rate of 2° C./minute. After 2 hours at plateau, the conversion is 6%.

The feedstock is then maintained for 34 hours, and then the temperature is elevated to 400° C. at a rate of 2° C./minute, and then after 2 hours at plateau, the conversion, which is 23%, is determined.

Tests 3a and 3b on the Catalysts C1 and C2 (Sulfurized, Activated, with N Introduced):

10 g of catalyst C (sulfurized, activated and containing 2% by weight of nitrogen) is tested with the test protocol 2b. After 2 hours at 300° C., no conversion is detected (<1%), as for the catalyst B, owing to the passivation of the acid sites. The temperature is raised to 360° C. at a rate of 2° C./minute, and then after 2 hours at plateau, there is no detectable conversion (<1%).

The feedstock is then maintained for 34 hours, and then the temperature is raised to 400° C. at a rate of 2° C./minute, and then after 24 hours at plateau, the conversion, which is 34%, is determined.

The following table summarizes the catalytic results.

decomposition under H2 of the sulfide precursor into H2S and continues by the sulfurization of oxides by H2S and H2. This reaction is fast and very exothermic, which has two consequences. First, it brings about the desorption of a certain quantity of nitrogen-containing compound and therefore has the effect of reducing the effectiveness of the passivation. This can explain the significant conversion at 360° C. in the case of the test 2b.

In the case of the test 2a, the activation procedure has been terminated by a stage at 350° C. that caused a certain desorption of the nitrogen-containing compound, also emphasizing this less effective passivation effect.

Secondly, the sulfur-containing phases that are obtained in-situ are of poorer quality, which is reflected by a reduced conversion in established operation.

Finally, it should be noted that the test procedure is extended by the in-situ activation.

The C1 and C2 catalysts according to the invention represent the best compromise between easy start-up and good final activity. They are well passivated (zero activity at 300° C., low activity at 360° C.) and have a good steady state activity. In contrast, the TCAE of the product C2 shows that it can be handled easily in air, which is an additional advantage.

| Test | Test Protocol | | Activity at 300° C. (%) | Activity at 360° C. (%) | Activity at 400° C. (%) | Duration of Test (Hours) |
|---|---|---|---|---|---|---|
| 1 | Activated Catalyst Protocol | Sulfurized, Activated Catalyst A, without N | 26 | — | 33 | 65 |
| 2a | In-Situ Activation | Sulfurized, Non-Activated Catalyst B, S, and then N | <1 | 10 | 28 | 72 |
| 2b | Activated Catalyst Protocol | Sulfurized, Non-Activated Catalyst B, S, and then N | <1 | 6 | 23 | 65 |
| 3a | Activated Catalyst Protocol | Sulfurized, Activated Catalyst C1, S and then N | <1 | <1 | 34 | 65 |
| 3b | Activated Catalyst Protocol | Sulfurized, Activated Catalyst C2, N and then S | <1 | 3 | 35 | 65 |

The results show that the catalyst A, which has not been passivated, is very active from the start-up of the reaction. For this reason, it is a catalyst that would be dangerous to use as such, under actual conditions of exploitation, without a special procedure for injection of the nitrogen-containing compound in-situ. Later, the plateau observed at 300° C. with the nitrogen-containing feedstock made it possible to passivate it, and it has a reference activity at 400° C.

The catalyst B is passivated, as indicated by the absence of activity at 300° C. At 360° C., in a surprising way, it already shows a certain activity. To explain this cracking activity at this point, it is possible to invoke the in-situ activation phase that begins toward 130-150° C. by the Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application Ser. No. 12/02.215, filed Aug. 9, 2012, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for ex-situ treatment of a catalyst that contains at least one hydrogenating phase and at least one zeolite that contains acid sites, wherein the zeolite content is from 1 to 70% weight, whereby said process comprises:
    a sulfurization/activation stage with a gas that contains hydrogen and hydrogen sulfide at a temperature of at least 250° C., followed by
    a stage for introducing nitrogen by contact at a temperature that is less than 100° C., with at least one basic nitrogen-containing compound that is ammonia or a compound that can decompose into ammonia, with said compound being introduced such that the resulting catalyst contains 0.5-10% by weight (expressed in terms of N) and with said nitrogen-containing compound being introduced ex-situ on a moving bed of the catalyst, and
    optionally drying the catalyst that is obtained.

2. Process according to claim 1, further comprising a passivation stage, after the stage for introducing nitrogen, which is achieved by heat treatment under hydrogen at at least 250° C.

3. Process according to claim 2, wherein the optionally dried catalyst is charged into a hydrocracking reactor, and passivation is achieved in the reactor.

4. Process according to claim 1, in which the hydrogen sulfide and the nitrogen are introduced in such a way that the catalyst that is obtained contains 5 to 25% by weight of S.

5. Process according to claim 1, wherein as a hydrogenating phase, the catalyst contains at least one element of the group VIB and at least one non-noble element of the group VIII.

6. Process according to claim 1, wherein the catalyst is a hydrocracking catalyst.

7. Process according to claim 1, wherein the zeolite is a Y zeolite.

8. Process according to claim 1, wherein the nitrogen-containing compound is selected from among the group of amines that are soluble in water.

9. Process according to claim 1, in which the nitrogen-containing compound is introduced by dry impregnation in the presence of a solvent and then the catalyst is dried.

10. Process according to claim 1, in which the catalyst is a new catalyst or a regenerated catalyst.

11. Process according to claim 1, in which the stage for introducing nitrogen is implemented in the absence of hydrogen.

12. Process according to claim 1, in which the hydrogen sulfide and the nitrogen are introduced in such a way that the catalyst that is obtained contains 8 to 15% by weight of S and 1 to 5% by weight of N.

13. A process for the transformation of hydrocarbon feedstocks which comprises a step of transforming hydrocarbon feedstocks in the presence of a catalyst that is obtained by the process according to claim 1.

14. A hydrocracking process which comprises a step of hydrocracking in the presence of a catalyst that is obtained by the process according to claim 1.

15. Process according to claim 1, in which the nitrogen-containing compound is introduced by dry impregnation in the presence of water as a solvent and then the catalyst is dried.

* * * * *